United States Patent
Stieger (10) Patent No.: US 11,063,494 B2
(45) Date of Patent: Jul. 13, 2021

(54) ELECTRICAL MACHINE APPARATUS

(71) Applicant: ROLLS-ROYCE plc, London (GB)

(72) Inventor: Rory D. Stieger, Derby (GB)

(73) Assignee: ROLLS-ROYCE PLC, London (GB)

( * ) Notice: Subject to any disclaimer, the term of this patent is extended or adjusted under 35 U.S.C. 154(b) by 377 days.

(21) Appl. No.: 16/014,090

(22) Filed: Jun. 21, 2018

(65) Prior Publication Data
US 2019/0006913 A1    Jan. 3, 2019

(30) Foreign Application Priority Data
Jun. 29, 2017   (GB) ..................................... 1710403

(51) Int. Cl.
| | | |
|---|---|---|
| *H02K 9/19* | (2006.01) | |
| *H02K 9/00* | (2006.01) | |
| *H02K 5/20* | (2006.01) | |
| *H02K 1/32* | (2006.01) | |
| *H02K 9/04* | (2006.01) | |
| *H02K 7/18* | (2006.01) | |
| *H02K 9/06* | (2006.01) | |
| *H02K 7/14* | (2006.01) | |

(52) U.S. Cl.
CPC .................. *H02K 9/19* (2013.01); *H02K 1/32* (2013.01); *H02K 5/20* (2013.01); *H02K 9/00* (2013.01); *H02K 9/04* (2013.01); *H02K 7/14* (2013.01); *H02K 7/1823* (2013.01); *H02K 9/06* (2013.01); *H02K 2205/12* (2013.01)

(58) Field of Classification Search
CPC .. H02K 9/19; H02K 1/32; H02K 5/20; H02K 9/005; H02K 9/04; H02K 7/14; H02K 7/1823; H02K 9/06; H02K 2205/12
See application file for complete search history.

(56) References Cited

U.S. PATENT DOCUMENTS

| | | | | | |
|---|---|---|---|---|---|
| 2003/0075996 | A1* | 4/2003 | Yoshida | .................... | H02K 1/20 310/58 |
| 2004/0108781 | A1* | 6/2004 | Razzell | .................. | H02K 51/00 310/112 |

(Continued)

FOREIGN PATENT DOCUMENTS

| | | |
|---|---|---|
| CN | 203883579 | 10/2014 |
| CN | 203967905 U | 11/2014 |

(Continued)

OTHER PUBLICATIONS

"Electric Flight," Siemens.com, Retrieved on Jun. 19, 2018, from https://www.siemens.com/press/en/feature/2015/corporate/2015-03-electromotor.php?content%5b%5d=corp.

(Continued)

*Primary Examiner* — Thienvu V Tran
*Assistant Examiner* — Bart Iliya
(74) *Attorney, Agent, or Firm* — Simpson & Simpson, PLLC; Robert P. Simpson (57) ABSTRACT

Electrical machine apparatus comprising: a rotor having a longitudinal axis and being arranged to rotate about the longitudinal axis in a first circumferential direction, the rotor defining one or more conduits for receiving fluid therein, the one or more conduits including an inlet and an outlet; and a fluid guide defining a first aperture arranged to direct fluid in a second direction towards the rotor, the second direction having a positive circumferential component in the first circumferential direction.

14 Claims, 8 Drawing Sheets

(56) References Cited

U.S. PATENT DOCUMENTS

| | | | |
|---|---|---|---|
| 2005/0189827 A1* | 9/2005 | Gozdawa | ............... F01D 25/12 |
| | | | 310/58 |
| 2008/0252077 A1 | 10/2008 | Myers | |
| 2014/0138951 A1 | 5/2014 | Kuczaj | |
| 2014/0246864 A1 | 9/2014 | McCormick | |
| 2016/0020673 A1 | 1/2016 | Pal | |
| 2016/0156251 A1 | 6/2016 | Sakurai et al. | |
| 2018/0051716 A1* | 2/2018 | Cheung | ............... B64D 27/20 |

FOREIGN PATENT DOCUMENTS

| | | |
|---|---|---|
| EP | 0649211 | 4/1995 |
| EP | 2003765 A2 | 12/2008 |
| EP | 2003765 A3 | 12/2011 |
| GB | 1147040 | 4/1969 |
| JP | H08111964 A | 4/1996 |
| JP | 2005237070 | 9/2005 |

OTHER PUBLICATIONS

Great Britain Search Report dated Nov. 27, 2017 issued in GB Patent Application No. 1710403.5.
Extended European Search Report and Opinion dated Oct. 31, 2018 issued in EP Patent Application No. No. 18175063.9.
Office Action dated dated Oct. 7, 2020 issued in EP Patent Application No. 18175063.9.

* cited by examiner

ELECTRICAL MACHINE APPARATUS

CROSS-REFERENCE TO RELATED APPLICATIONS

This specification is based upon and claims the benefit of priority from GB Patent Application Number 1710403.5 filed on 29 Jun. 2017, the entire contents of which are incorporated herein by reference.

BACKGROUND

Technical Field

The present disclosure concerns electrical machine apparatus.

Description of the Related Art

Electrical machines, such as generators and motors, may include a stator, a rotor, a magnet arrangement, and an electrical conductor (often referred to as 'windings'). In some examples, the magnet arrangement may be permanent magnets that are mounted on the rotor and the electrical conductor may be mounted on the stator. Where such an electrical machine operates as a generator, the rotor may be rotated and the moving magnetic field generated by the magnet arrangement induces a current in the electrical conductor to provide an electrical output from the electrical machine. Where such an electrical machine operates as a motor, electricity may be supplied to the electrical conductor to generate a magnetic field that attracts/repels the magnet arrangement and thus causes the rotor to rotate. The magnet arrangement mounted on the rotor may generate thermal energy during operation that may be detrimental to the operation of the electrical machine.

SUMMARY

According to a first aspect there is provided electrical machine apparatus comprising: a rotor having a longitudinal axis and being arranged to rotate about the longitudinal axis in a first circumferential direction, the rotor defining one or more conduits for receiving fluid therein, the one or more conduits including an inlet and an outlet; and a fluid guide defining a first aperture arranged to direct fluid in a second direction towards the rotor, the second direction having a positive circumferential component in the first circumferential direction.

An orientation of the first aperture may have a positive circumferential component in the first circumferential direction.

The fluid guide may comprise one or more vanes positioned within the first aperture. The one or more vanes may be oriented to direct fluid in the second direction.

The second direction may have a radial component.

The rotor may comprise a radial turbine arranged to direct the fluid into the inlet of the one or more conduits.

The electrical machine apparatus may further comprise a stator. The radial turbine may define an aperture arranged to direct fluid towards a gap between the rotor and the stator.

The rotor may comprise a radial compressor arranged to receive the fluid from the outlet of the one or more conduits.

The rotor may comprise a turbine positioned at the outlet of the one or more conduits of the rotor.

The fluid guide may define a second aperture arranged to exhaust the fluid from the electrical machine apparatus.

The fluid guide may be a casing of the electrical machine apparatus.

According to a second aspect there is provided a gas turbine engine comprising electrical machine apparatus as described in any of the preceding paragraphs.

The gas turbine engine may further comprise a core engine casing and a vane. The core engine casing and the vane may define a conduit for providing fluid to the first aperture of the fluid guide.

The gas turbine engine may further comprise a compressor, a turbine, and a shaft connected to the compressor and to the turbine. A first portion of the shaft may extend downstream from the turbine. The electrical machine apparatus may be mounted directly on the first portion of the shaft.

According to a third aspect there is provided a system comprising a gas turbine engine and electrical machine apparatus as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
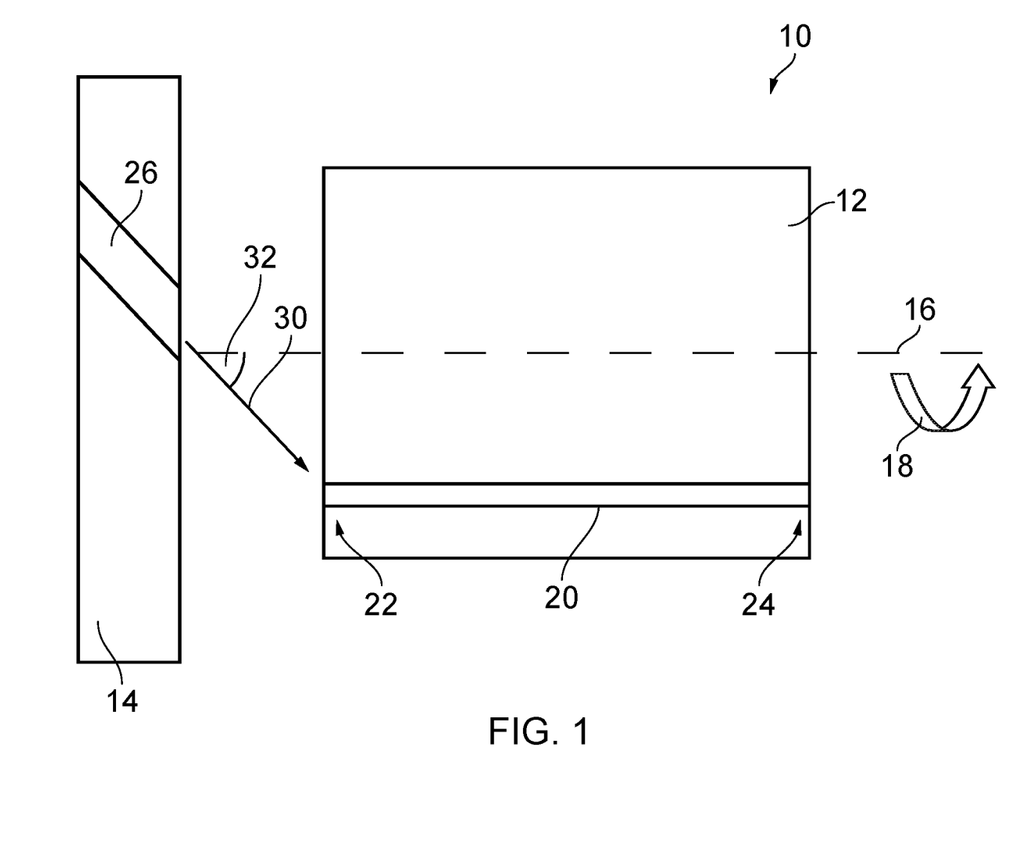
FIG. 1 illustrates a plan view of electrical machine apparatus according to a first example.

FIG. 1 illustrates a plan view of electrical machine apparatus 10 according to a first example. The electrical machine apparatus 10 includes a rotor 12 and a fluid guide 14. The electrical machine apparatus 10 may be configured to operate as an electrical generator or as an electrical motor.

In some examples, the electrical machine apparatus 10 may be a module. As used herein, the wording 'module' refers to a device or apparatus where one or more features are included at a later time and, possibly, by another manufacturer or by an end user. For example, where the electrical machine apparatus 10 is a module, the electrical machine apparatus 10 may only include the rotor 12 and the fluid guide 14, and the remaining features (such as a magnet arrangement, a stator, and electrical windings for example) may be added by another manufacturer, or by an end user.

The rotor 12 may comprise any suitable ferromagnetic material (such as iron, nickel, or cobalt for example) and may have any suitable shape (for example, the rotor 12 may have a circular cross sectional shape or a polygonal cross sectional shape). The rotor 12 has a longitudinal axis 16 and is arranged to rotate about the longitudinal axis 16 in a first circumferential direction 18. The rotor 12 defines a conduit 20 for receiving fluid therein and includes an inlet 22 and an outlet 24.

The fluid guide 14 may comprise any suitable structure for directing the flow of fluid. For example, the fluid guide 14 may be a component of the electrical machine apparatus 10, and in some examples, may be a static component of the electrical machine apparatus 10, such as a casing of the electrical machine apparatus 10. The fluid guide 14 defines a first aperture 26 that is arranged to direct fluid in a second direction (represented by arrow 30) towards the rotor 12. The second direction has a positive circumferential component (represented by angle 32) in the first circumferential direction. Consequently, the first aperture 26 may be considered to 'swirl' the fluid to the rotor 12 about the longitudinal axis 16.

In operation, the rotor 12 rotates about the longitudinal axis 16 in the first circumferential direction 18 and a magnet arrangement mounted on the rotor 12 generates thermal energy which flows into the rotor 12. The fluid guide 14 directs fluid to the rotor 12 in the second direction and the fluid enters the conduit 20 via the inlet 22. The fluid then flows along the conduit 20 and exits the rotor 12 at the outlet 24.

The electrical machine apparatus 10 may provide several advantages. First, thermal energy may be transferred from the rotor 12 to the fluid flowing through the conduit 20. This may advantageously cool the rotor 12 and may prevent the electrical machine apparatus 10 from being damaged by relatively high operating temperatures. Second, the swirl of the fluid from the first aperture 26 to the rotor 12 may advantageously reduce the windage drag experienced by the rotor 12. Where the fluid is provided from a high pressure source and has a higher rotational velocity than the rotor 12, the swirl of the fluid may provide a beneficial windage effect on the rotor 12. Third, the electrical machine apparatus 10 may reduce the relative total temperature of the fluid flow to the rotor 12 as the relative velocity difference between the fluid and the rotor 12 is reduced by the swirl of the fluid.

Figure 2A:
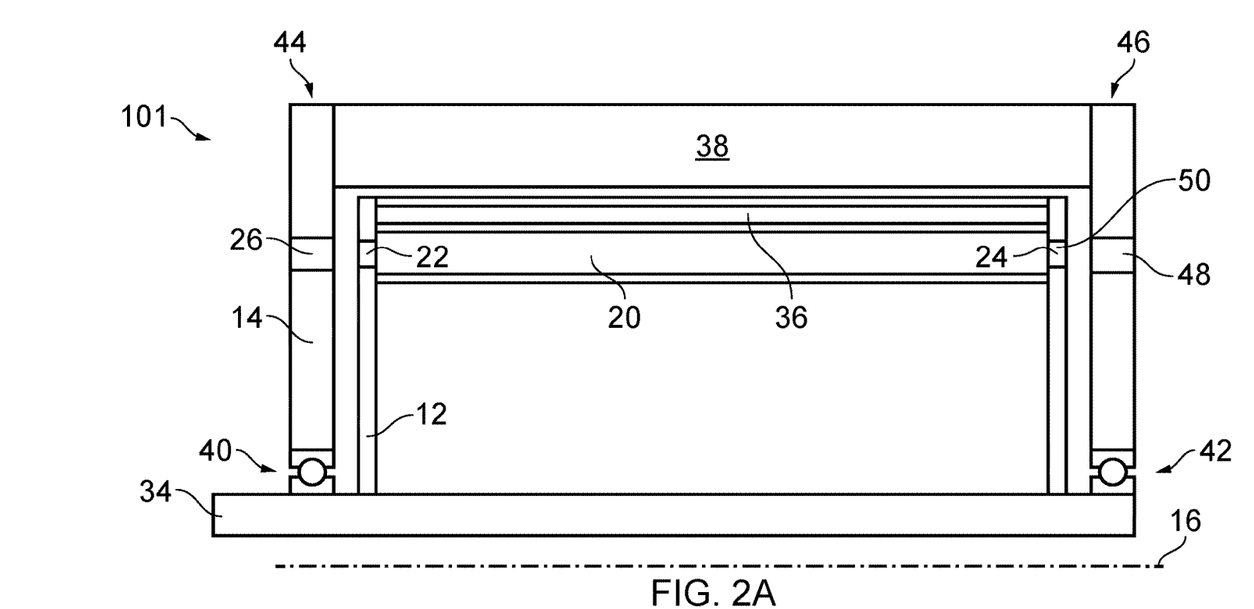
FIG. 2A illustrates a cross sectional side view of electrical machine apparatus according to a second example.
Figure 2B:
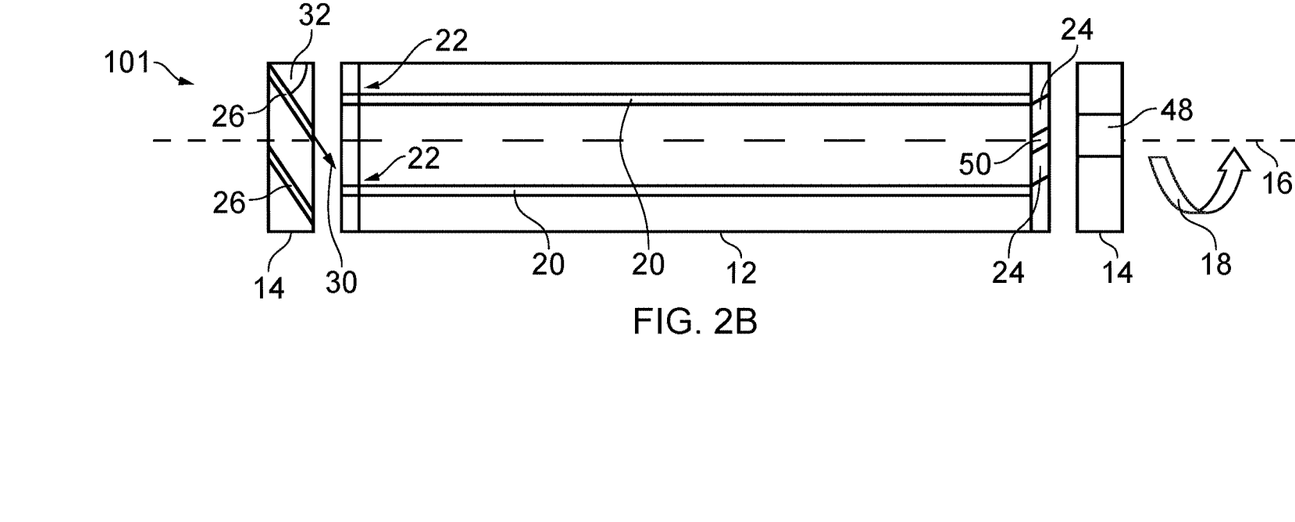
FIG. 2B illustrates a plan view of the electrical machine apparatus illustrated in FIG. 2A.

FIGS. 2A and 2B illustrate a cross sectional side view and a plan view respectively of electrical machine apparatus 101 according to a second example. The electrical machine apparatus 101 is similar to the electrical machine apparatus 10 and where the features are similar, the same reference numerals are used.

The electrical machine apparatus 101 includes a shaft 34, a rotor 12, a magnet arrangement 36 mounted on the rotor 12, a stator 38, a first bearing 40, a second bearing 42, and a casing 14.

The shaft 34 is arranged to rotate about the longitudinal axis 16 in the first circumferential direction 18. The rotor 12 and the magnet arrangement 36 are mounted on the shaft 34 and are thus also arranged to rotate about the longitudinal axis 16. The magnet arrangement 36 may be an arrangement of permanent magnets, or may be an elongate electrical conductor (which may be referred to as 'windings') that is arranged to function as an electromagnet (for wound field or induction), or may comprise a plurality of ferromagnetic laminations (where the electrical machine 101 is a switched reluctance motor).

The casing 14 has a first end member 44 and a second end member 46 that extend perpendicular to the longitudinal axis 16. The first end member 44 of the casing 14 is mounted on the shaft 34 by the first bearing 40, and the second end member 44 of the casing 14 is mounted on the shaft 34 by the second bearing 42. The casing 14 is thus static relative to the shaft 34. The stator 38 is mounted on the casing 14 between the first end member 44 and the second end member 46 and is also static relative to the shaft 34, the rotor 12 and the magnet arrangement 36. The stator 38 may comprise an arrangement of permanent magnets, or may comprise an elongate electrical conductor (which may be referred to as 'windings') that is configured to function as an electromagnet, or may comprise a plurality of ferromagnetic laminations (where the electrical machine 101 is a switched reluctance motor).

The first end member 44 of the casing 14 defines a plurality of first apertures 26 that are arranged in a ring around the longitudinal axis 16. The plurality of first apertures 26 are arranged to receive fluid from a source of fluid and the casing 14 thus provides a fluid guide for the electrical machine apparatus 101. As illustrated in FIG. 2B, the orientation of the first apertures 26 has a positive circumferential component (represented by angle 32) in the first circumferential direction. The orientation of the first apertures 26 also has an axial component (that is, the first apertures 26 also extend along the longitudinal axis 16). Consequently, the plurality of first apertures 26 are arranged to direct fluid in a second direction (represented by arrow 30) towards the rotor 12 where the second direction has an axial component and a positive circumferential component in the first circumferential direction.

The second end member 46 of the casing 14 defines one or more second apertures 48 for exhausting fluid from the electrical machine apparatus 101.

The rotor 12 defines a plurality of conduits 20 for receiving fluid therein and each conduit 20 includes an inlet 22 and an outlet 24. The rotor 12 comprises a turbine 50 positioned at the outlets 24 of the conduits 20. The turbine 50 is arranged to receive fluid from the conduits 20 and is arranged to provide torque to the shaft 34 in the first circumferential direction 18 (and thus provide additional power to the shaft 34). In some examples, the turbine 50 is formed from a plurality of angled holes in the rotor 12.

Figure 3A:
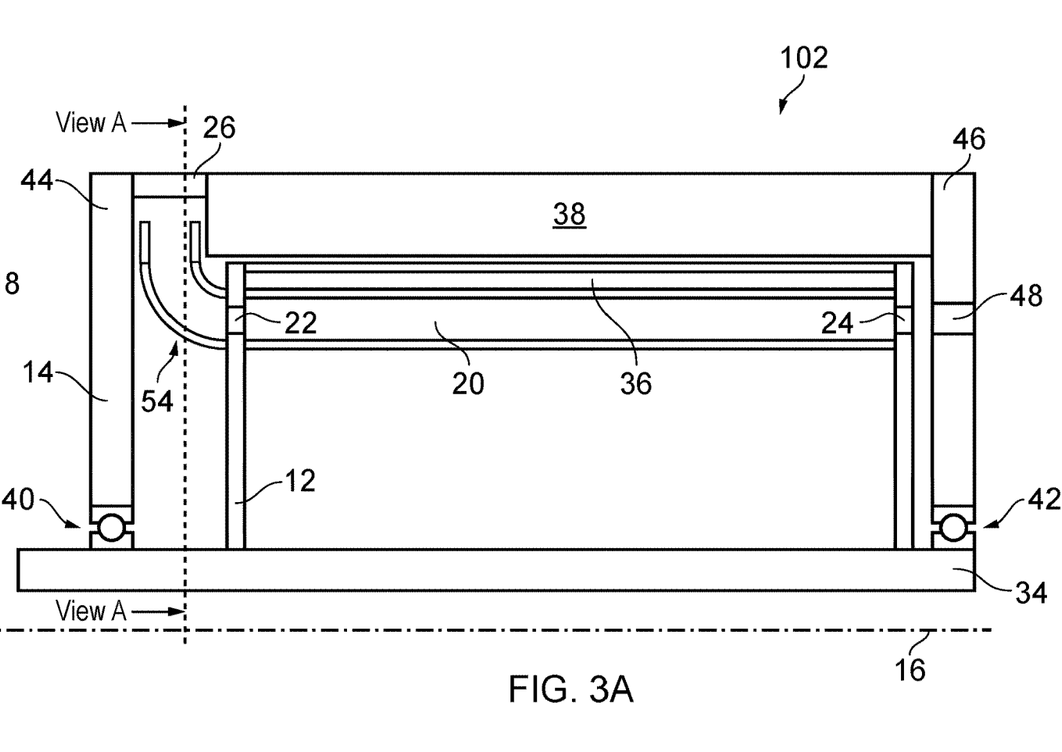
FIG. 3A illustrates a cross sectional side view of electrical machine apparatus according to a third example.
Figure 3B:
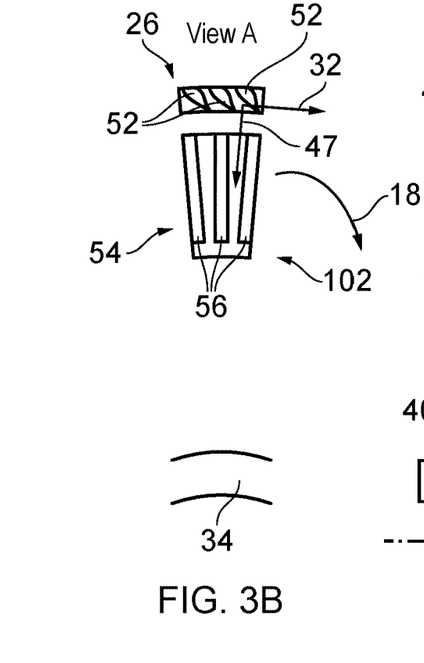
FIG. 3B illustrates a cross sectional front view of the electrical machine apparatus illustrated in FIG. 3A through section A-A.

FIGS. 3A and 3B illustrate a cross sectional side view and a cross sectional front view (through view A-A in FIG. 3A) respectively of electrical machine apparatus 102 according to a third example. The electrical machine apparatus 102 is similar to the electrical machine apparatus 10, 101 and where the features are similar, the same reference numerals are used.

The electrical machine apparatus 102 is similar to the electrical machine apparatus 101 in that the shaft 34, the rotor 12, and the magnet arrangement 36 are arranged to rotate about the longitudinal axis 16 in a first circumferential direction. The rotor 12 may or may not comprise a turbine at the outlets 24 of the conduits 20.

The electrical machine apparatus 102 differs from the electrical machine apparatus 101 in that the casing 14 defines one or more first apertures 26 that extend radially inwards and are located between the first end member 44 and the stator 38. The casing 14 comprises a plurality of vanes 52 that are positioned within the one or more first apertures 26 and are oriented to direct fluid in a second direction towards the rotor 12. The second direction has a radial component 37 (inwards towards the longitudinal axis 16) and a positive circumferential component 32 in the first circumferential direction 18.

The rotor 12 includes a radial turbine 54 that extends from the left hand side of the rotor 12 (as illustrated in FIG. 3A) and is arranged to direct the fluid received from the one or more first apertures 26 into the inlets 22 of the one or more conduits 20. The radial turbine 54 includes a plurality of radially aligned vanes 56 that are arranged to extract work from the fluid and thus reduce the temperature of the fluid. In some examples, the vanes of the radial turbine 54 may not be wholly radial, and the radial angle of the vane may vary along the radius of the vane.

Figure 4A:
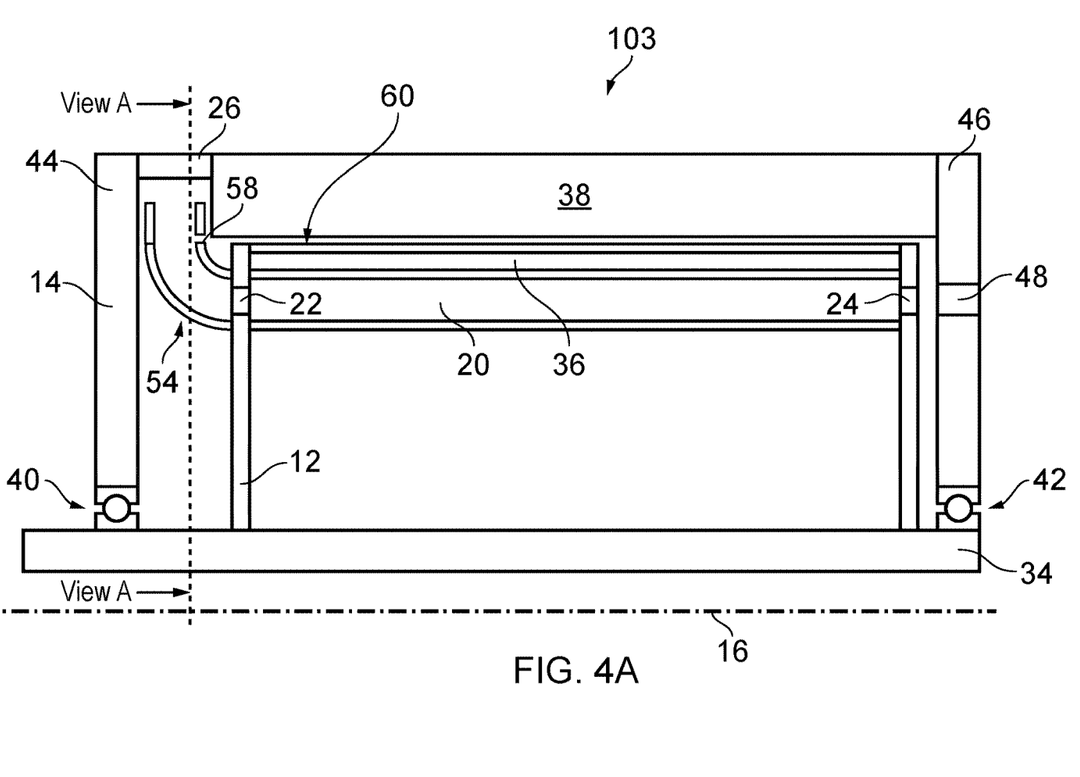
FIG. 4A illustrates a cross sectional side view of electrical machine apparatus according to a fourth example.
Figure 4B:
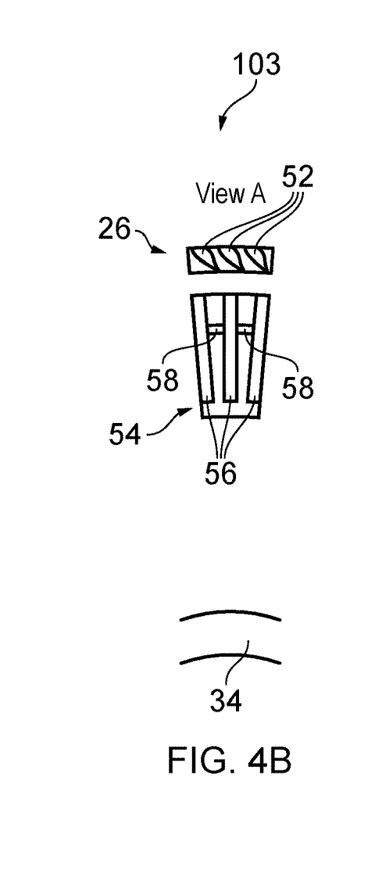
FIG. 4B illustrates a front view of the electrical machine apparatus illustrated in FIG. 4A through section A-A.

FIGS. 4A and 4B illustrate a cross sectional side view and a cross sectional front view respectively of electrical machine apparatus 103 according to a fourth example. The electrical machine apparatus 103 is similar to the electrical machine apparatus 102 and where the features are similar, the same reference numerals are used.

The electrical machine apparatus 103 is different to the electrical machine apparatus 102 in that the radial turbine 54 defines one or more apertures 58 that are arranged to direct fluid towards a gap 60 between the rotor 12 and the stator 38. The one or more apertures 58 provide a bleed part way through the expansion process in the radial turbine 54 to bleed partially cooled and expanded fluid to flood the gap 60 between the rotor 12 and the stator 38. The rotational velocity of the fluid exhausted from the one or more apertures 58 may be controlled to be half the rotational velocity of the rotor 12 to minimise windage heat generation in the gap 60 between the rotor 12 and the stator 38. For example, one or more circumferential components (such as one or more vanes) in each of the one or more apertures 58 may be provided to achieve the desired rotational velocity of the fluid.

Figure 5:
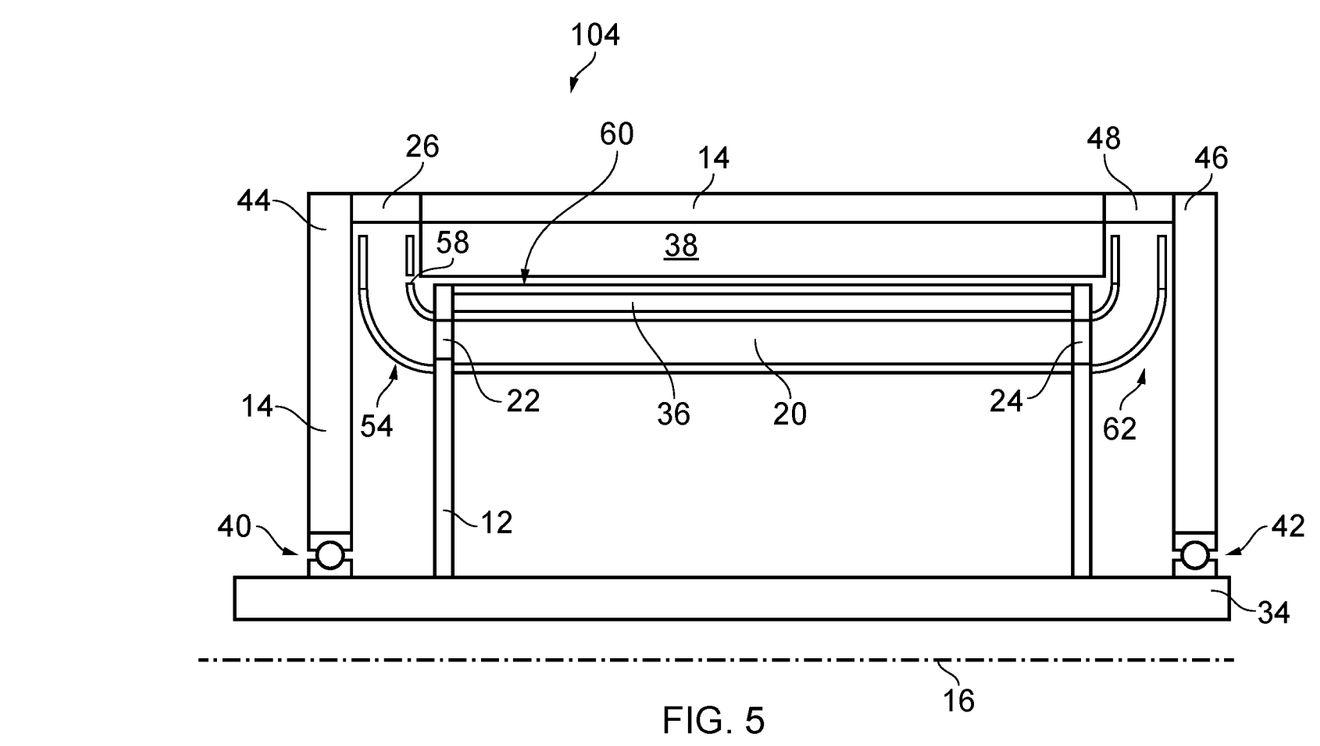
FIG. 5 illustrates a cross sectional side view of electrical machine apparatus according to a fifth example.

FIG. 5 illustrates a cross sectional side view of electrical machine apparatus 104 according to a fifth example. The electrical machine apparatus 104 is similar to the electrical machine apparatus 103 and where the features are similar, the same reference numerals are used.

The electrical machine apparatus 104 is different to the electrical machine apparatus 103 in that the rotor 12 comprises a radial compressor 62 that extends from the right hand side of the rotor 12 and is arranged to receive the fluid from the one or more outlets 24 of the respective one or more conduits 20. The radial compressor 62 is arranged to increase the pressure of the fluid leaving the rotor 12 and may thus allow the rotor 12 to operate at a lower fluid pressure. The radial compressor 62 may thus increase the turbine expansion ratio of the radial turbine 54.

The electrical machine apparatus 104 also differs from the electrical machine apparatus 103 in that the casing 14 extends axially across the stator 38 and thus houses the stator 38. The casing 14, the stator 38 and the second end member 46 define the one or more second apertures 48 for exhausting fluid from the electrical machine apparatus 101. The one or more second apertures 48 extend radially through the casing 14 and are axially aligned with the outlet of the radial compressor 62. In some examples, the one or more second apertures 48 may not be wholly radial (they may have a circumferential component and/or an axial component for example). Furthermore, the one or more second apertures 48 may not be wholly axially aligned (or may not be aligned at all) with the outlet of the radial compressor 62.

Figure 6:
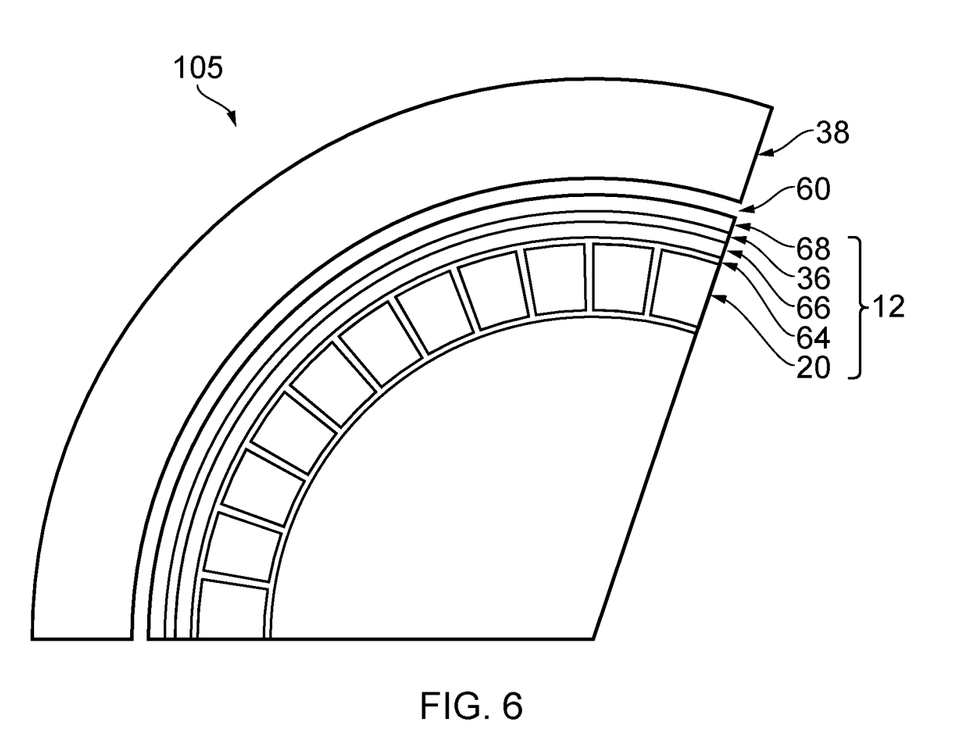
FIG. 6 illustrates a cross sectional front view of an electrical machine apparatus according to a sixth example.

FIG. 6 illustrates a cross sectional front view of an electrical machine apparatus 105 according to a sixth example. The electrical machine apparatus 105 is similar to the electrical machine apparatus 10, 101, 102, 103, 104 and where the features are similar, the same reference numerals may be used.

The electrical machine apparatus 105 includes a rotor 12 and a stator 38 that define a gap 60 there between. Starting from the radially innermost part, the rotor 12 includes a thermally conductive member 64 that defines a plurality of conduits 20, a ferromagnetic member 66 (backing iron for example), a magnet arrangement 36, and banding 68. The thermally conductive member 64 is coupled to the ferromagnetic member 66 and the magnet arrangement 36 is coupled to the ferromagnetic member 66 by the banding 68.

The thermally conductive member 64 may comprise any suitable material. In some examples, the thermally conductive member 64 may comprise the same material as (and may be integral to and part of) the ferromagnetic member 66. In other examples, the thermally conductive member 64 may comprise a different material to the ferromagnetic member 66 and may comprise a light and thermally conductive material with a low magnetic permeability such as aluminium.

The thermally conductive member 64 may be manufactured as a complete ring, or may be manufactured from folded sheet metal. The folding may be designed to minimise windage friction on the inner surface of the thermally conductive member 64 by closing any gaps. For example, the folded sheet metal of the thermally conductive member 64 may define conduits 20 having triangular cross sectional shapes. This may also advantageously increase the available surface area of the thermally conductive member 64 for heat dissipation.

It should be appreciated that any of the electrical machine apparatus 10, 101, 102, 103, 104 may have the structure illustrated in FIG. 6.

Figure 7:
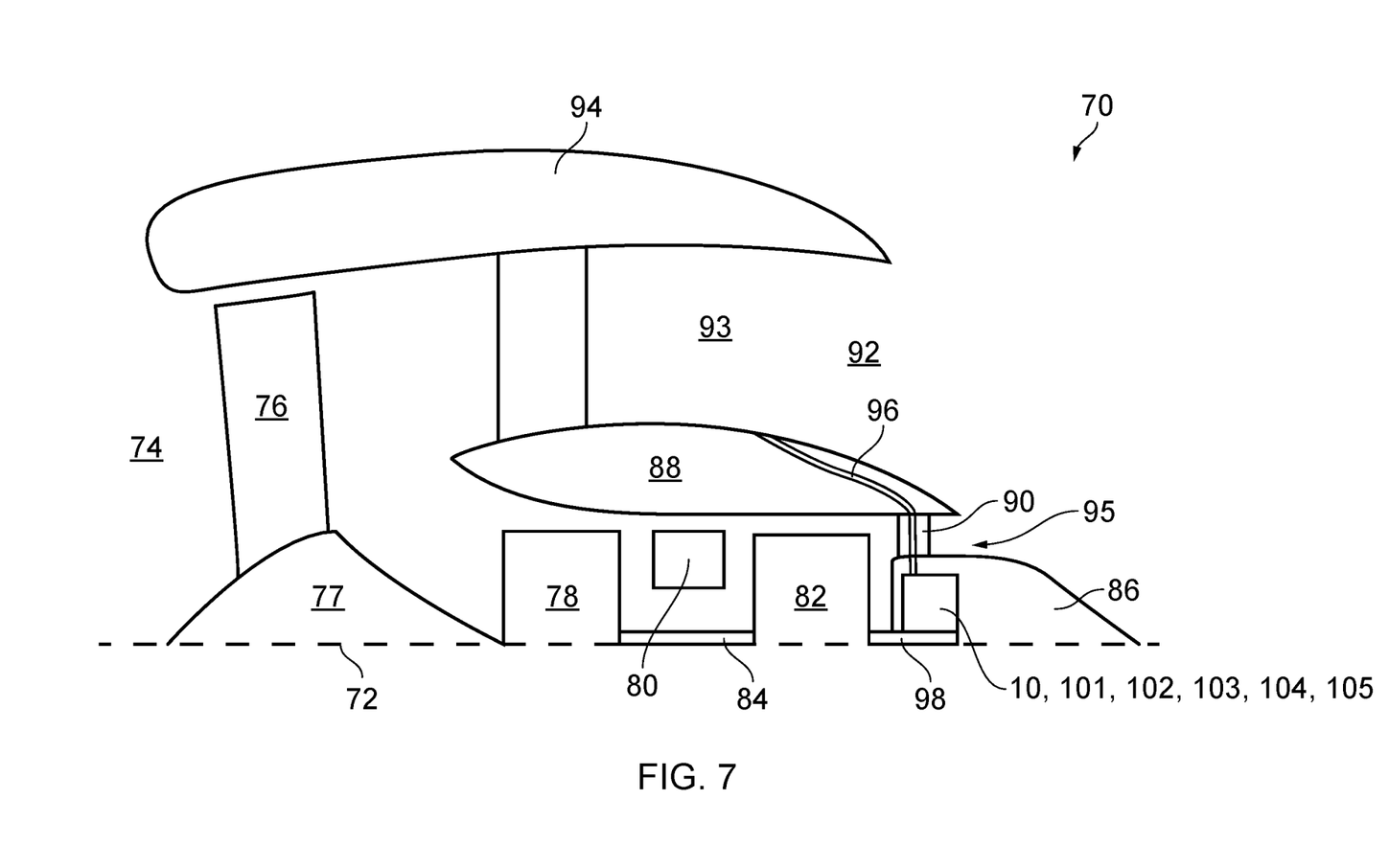
FIG. 7 illustrates a cross sectional side view of a gas turbine engine comprising an electrical machine apparatus according to an example.

FIG. 7 illustrates a cross sectional side view of a gas turbine engine 70 comprising electrical machine apparatus 10, 101, 102, 103, 104, 105 according to an example. The gas turbine engine 70 has a rotational axis 72 and comprises an air intake 74, a propulsive fan 76, a nose cone 77, a compressor 78, combustion equipment 80, a turbine 82, a shaft 84, a tail cone 86, a core engine casing 88, a turbine outlet guide vane 90, a first exhaust nozzle 92, and a second exhaust nozzle 95. A nacelle 94 generally surrounds the gas turbine engine 70 and defines the air intake 74, the first exhaust nozzle 92 and a bypass duct 93. The second exhaust nozzle 95 is defined by the core engine casing 88 and the tail cone 86.

The core engine casing 88 and the turbine outlet guide vane 90 define a conduit 96 for providing fluid from the bypass duct 93 to the one or more first apertures 26 of the fluid guide 14. Where a casing of the tail cone 86 is separate to the casing 14 of the electrical machine apparatus 10, 101, 102, 103, 104, 105, the tail cone 86 additionally defines the conduit 96.

The shaft 84 is connected to the compressor 78 and to the turbine 82 and includes a first portion 98 that extends downstream from the turbine 82. The electrical machine apparatus 10, 101, 102, 103, 104, 105 is mounted directly on the first portion 98 of the shaft 84 (in other words, the first portion 98 may be the shaft 34 illustrated in FIGS. 2A, 2B, 3A, 3B, 4A, 4B, and 5).

It should be appreciated that the gas turbine engine 70 may have any number of compressors, turbines and interconnecting shafts. Furthermore, the gas turbine engine 70 may additionally comprise a gearbox in the powertrain between the shaft 84 and the propulsive fan 76.

Figure 8:
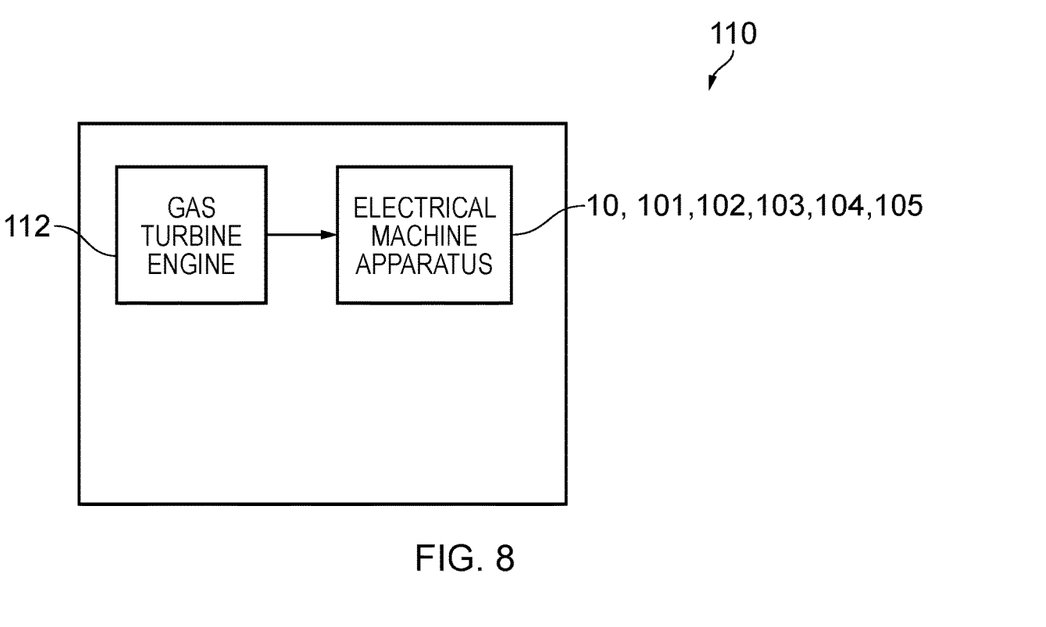
FIG. 8 illustrates a schematic diagram of a system comprising an electrical machine apparatus according to various examples.

FIG. 8 illustrates a schematic diagram of a system 110 comprising an electrical machine apparatus 10, 101, 102, 103, 104, 105 and a gas turbine engine 112.

In some examples, the electrical machine apparatus 10, 101, 102, 103, 104, 105 may be arranged to receive electrical energy from an accessory gearbox of the gas turbine engine 112 and function as an electrical motor. The electrical machine apparatus 10, 101, 102, 103, 104, 105 may be arranged to provide torque to a propulsive fan mounted on an aircraft, vessel, or vehicle.

In other examples where the gas turbine engine 112 is the same as the gas turbine engine 70, the electrical machine apparatus 10, 101, 102, 103, 104, 105 may be arranged to receive electrical energy from the electrical machine apparatus 10, 101, 102, 103, 104, 105 of the gas turbine engine 70 and function as an electrical motor. The electrical machine apparatus 10, 101, 102, 103, 104, 105 may be arranged to provide torque to a propulsive fan mounted on an aircraft, vessel, or vehicle.

It will be understood that the invention is not limited to the embodiments above-described and various modifications and improvements can be made without departing from the concepts described herein. For example, the casings 14 of the electrical machine apparatus 101, 102, 103, 104 may not be dedicated electrical machine casings and may instead be formed from structures of a gas turbine engine (such as a tail cone of a gas turbine engine for example).

In other examples, the electrical machine apparatus 10, 101, 102, 103, 104 may be mounted within a gas turbine engine having a single exhaust nozzle.

Except where mutually exclusive, any of the features may be employed separately or in combination with any other features and the disclosure extends to and includes all combinations and sub-combinations of one or more features described herein.

I claim:

1. Electrical machine apparatus comprising:
a rotor having a longitudinal axis and first and second axial ends, the rotor being arranged to rotate about the longitudinal axis in a first circumferential direction, the rotor defining one or more conduits for receiving a fluid therein, the one or more conduits extending between the first and second axial ends of the rotor in a direction of the longitudinal axis and including an inlet and an outlet; and
a fluid guide defining a first aperture arranged to receive the fluid from a high pressure source and to direct the fluid in a second direction towards the rotor such that the fluid enters the one or more conduits via the inlet and exits the one or more conduits via the outlet, the second direction having a positive circumferential component in the first circumferential direction to provide the fluid with a higher rotational velocity than the rotor and swirl the fluid to the rotor about the longitudinal axis so that thermal energy is transferred from the rotor to the fluid flowing through the one or more conduits and the swirl of the fluid to the rotor reduces windage drag of the rotor.

2. Electrical machine apparatus as claimed in claim 1, wherein an orientation of the first aperture has a positive circumferential component in the first circumferential direction.

3. Electrical machine apparatus as claimed in claim 1, wherein the fluid guide comprises one or more vanes positioned within the first aperture, the one or more vanes being oriented to direct fluid in the second direction.

4. Electrical machine apparatus as claimed in claim 1, wherein the second direction has a radial component.

5. Electrical machine apparatus as claimed in claim 1, wherein the rotor comprises a radial turbine arranged to direct the fluid into the inlet of the one or more conduits.

6. Electrical machine apparatus as claimed in claim 5, further comprising a stator, the radial turbine defining an aperture arranged to direct fluid towards a gap between the rotor and the stator.

7. Electrical machine apparatus as claimed in claim 1, wherein the rotor comprises a radial compressor arranged to receive the fluid from the outlet of the one or more conduits.

8. Electrical machine apparatus as claimed in claim 1, wherein the rotor comprises a turbine positioned at the outlet of the one or more conduits of the rotor.

9. Electrical machine apparatus as claimed in claim 1, wherein the fluid guide defines a second aperture arranged to exhaust the fluid from the electrical machine apparatus.

10. Electrical machine apparatus as claimed in claim 1, wherein the fluid guide is a casing of the electrical machine apparatus.

11. A gas turbine engine comprising electrical machine apparatus as claimed in claim 1.

12. A gas turbine engine as claimed in claim 11, further comprising a core engine casing and a vane, the core engine casing and the vane defining a conduit for providing fluid to the first aperture of the fluid guide.

13. A gas turbine engine as claimed in claim 11, further comprising a compressor, a turbine, and a shaft connected to the compressor and to the turbine, a first portion of the shaft extending downstream from the turbine, the electrical machine apparatus being mounted directly on the first portion of the shaft.

14. A system comprising a gas turbine engine and electrical machine apparatus as claimed in claim 1.

* * * * *